(12) United States Patent
Qi et al.

(10) Patent No.: US 12,555,384 B2
(45) Date of Patent: Feb. 17, 2026

(54) METHOD AND SYSTEM FOR DETECTING ABNORMAL TRAFFIC BEHAVIOR

(71) Applicant: NANJING UNIVERSITY OF SCIENCE AND TECHNOLOGY, Nanjing (CN)

(72) Inventors: Yong Qi, Nanjing (CN); Xin Zeng, Nanjing (CN); Yuan Zhuang, Nanjing (CN)

(73) Assignee: NANJING UNIVERSITY OF SCIENCE AND TECHNOLOGY, Jiangsu (CN)

( * ) Notice: Subject to any disclaimer, the term of this patent is extended or adjusted under 35 U.S.C. 154(b) by 0 days.

(21) Appl. No.: 18/681,766

(22) PCT Filed: Apr. 20, 2023

(86) PCT No.: PCT/CN2023/089430
§ 371 (c)(1),
(2) Date: Feb. 6, 2024

(87) PCT Pub. No.: WO2023/207742
PCT Pub. Date: Nov. 2, 2023

(65) Prior Publication Data
US 2025/0078516 A1    Mar. 6, 2025

(30) Foreign Application Priority Data
Apr. 28, 2022 (CN) .......................... 202210457144.4

(51) Int. Cl.
G06V 20/54 (2022.01)
G06V 10/75 (2022.01)
(Continued)

(52) U.S. Cl.
CPC .............. *G06V 20/54* (2022.01); *G06V 10/75* (2022.01); *G06V 10/806* (2022.01); *G06V 20/70* (2022.01); *G08G 1/017* (2013.01)

(58) Field of Classification Search
CPC ...... G06V 20/54; G06V 10/75; G06V 10/806; G06V 20/70; G06V 2201/08; G06V 10/82;
(Continued)

(56) References Cited

FOREIGN PATENT DOCUMENTS

CN   114049771 A   *   2/2022   ............. G06F 18/24

OTHER PUBLICATIONS

Qiu et al. "Learning Spatio-Temporal Representation with Pseudo-3D Residual Networks" ICCV, 2017, pp. 5534-5542 (Year: 2017).*
(Continued)

*Primary Examiner* — Wassim Mahrouka
(74) *Attorney, Agent, or Firm* — Armis IP Law, LLC

(57) ABSTRACT

The present disclosure discloses a method and a system for detecting an abnormal traffic behavior. The method of the present disclosure includes: retaining an abnormal static target vehicle in a traffic surveillance video in a background through background modeling; performing abnormal target detection, and obtaining a cropped picture of an abnormal target vehicle and a cropped video clip through cropping; performing anomaly start time estimation, inputting the cropped picture and the cropped video clip to a network model combining twin cross-correlation with pseudo three-dimensional (P3D)-Attention, labeling a classification label on the cropped video clip, and determining a video frame when abnormal behavior occurs; and determining whether a to-be-matched vehicle is an abnormal target vehicle, and determining a start time and an end time of abnormal traffic behavior with reference to the video frame that is obtained when the abnormal behavior occurs.

16 Claims, 6 Drawing Sheets

(51) Int. Cl.
    *G06V 10/80*     (2022.01)
    *G06V 20/70*     (2022.01)
    *G08G 1/017*     (2006.01)

(58) Field of Classification Search
    CPC ........ G06V 20/52; G08G 1/017; G06F 18/00;
                 G06F 18/253; G06F 18/22; G06N 3/045;
                         G06N 3/047; G06N 3/08
    See application file for complete search history.

(56) References Cited

OTHER PUBLICATIONS

Wang et al "Learning Attentions: Residual Attentional Siamese Network for High Performance Online Visual Tracking" (Year: 2018).*

Zhao et al. "Good Practices and a Strong Baseline for Traffic Anomaly Detection" CVPR Workshops, 2021, pp. 3993-4001 (Year: 2021).*

English translation of Yang et al. (CN114049771A) (Year: 2022).*

\* cited by examiner

METHOD AND SYSTEM FOR DETECTING ABNORMAL TRAFFIC BEHAVIOR

CROSS REFERENCE TO RELATED APPLICATION

This application is a national stage application of International Patent Application No. PCT/CN2023/089430, filed on Apr. 20, 2023, which claims priority to the Chinese Patent Application No. 202210457144.4, filed with the China National Intellectual Property Administration (CNIPA) on Apr. 28, 2022, and entitled "METHOD AND SYSTEM FOR DETECTING ABNORMAL TRAFFIC BEHAVIOR", which is incorporated herein by reference in its entirety.

TECHNICAL FIELD

The present disclosure pertains to the field of intelligent video analysis technologies, and specifically relates to a method and a system for detecting an abnormal traffic behavior.

BACKGROUND

Computer vision has become a key technology for many applications. Compared with other information sources such as manual monitoring, a GPS, and a radar signal, visual data includes rich information. Therefore, the visual data can also play a vital role in detecting/predicting traffic congestion, accidents, and other abnormal phenomena.

Abnormal behavior detection is a sub-field of monitoring scenario behavior understanding. An anomaly is usually expressed as a deviation between a scenario entity and a normal behavior, and is a data mode that does not conform to a defined concept of a good normal behavior.

In a typical abnormal behavior detection method, an abnormal concept is modeled by training and learning a normal behavior and by using a normal training sample, and a deviation from a normal mode is identified as an abnormal phenomenon. Any behavior that significantly deviates from the normal behavior may be called an anomaly. For example, a stalling vehicle on a road, bypassing a traffic light at a traffic intersection, or turning around at a red light are some abnormal phenomena. Some studies use a series of statistical patterns to learn an anomaly, such as sparse reconstruction, which measures an anomaly by using a calculation error in a semi-supervised manner and based on reconstruction, and treats behavior deviating from normal behavior as abnormal behavior. In addition, with the development of a deep learning technology, an anomaly prediction task may be resolved by using a depth automatic encoder with a reconstruction loss. Although these methods have made considerable progress in abnormal datasets such as CUHKAvenue, these methods are not suitable for detecting road traffic with a more complex and unknown scenario and a local abnormal behavior.

According to a classification-based abnormal behavior detection method, abnormal data with label information is used to model an anomaly abstraction, and a classifier is used to distinguish between a normal class and an abnormal class in a given feature space. This requires a large quantity of tag instances containing normal classes and abnormal classes. One method is to design a graph-convolutional network to correct a noise label, so that the network can provide clean data for an action classifier for supervised learning. A frame-level area under the curve (AUC) score obtained based on University of Central Florida (UCF)-Crime is 82.12%. A training video with a weak tag is used and a video clip is considered as an instance in multi-instance learning (MIL) for training, and a trained depth anomaly ranking model may obtain a higher anomaly score on a Real-world dataset.

With the rapid development of deep learning, great success has been achieved in basic computer vision problems such as image classification, target detection, and tracking. Classification precision even exceeds that of humans. Usually, a large-scale tag dataset is not required in tracking auxiliary anomaly detection, and may be easily transferred to another unknown scenario. For a road scenario, an unsupervised anomaly detection method that relies on target detection and tracking attracts a large quantity of researchers. However, an assumption used in the anomaly detection cannot be generally applicable to different traffic scenarios. Therefore, some methods divide a road traffic analysis system into four layers, namely, image acquisition, static and dynamic feature extraction, behavior understanding, and a subsequent service.

In a background of traffic visual monitoring, a local anomaly is also referred to as a point anomaly. A vehicle that is static on a normal road may be referred to as a point anomaly. Some methods use background modeling to remove all moving objects while remaining a stagnant vehicle in the background to analyze a potential static vehicle. For example, a dynamic mode of a vehicle is learned by tracking a vehicle track for track estimation, to find an abnormal track and perform anomaly detection. For a background image sequence, a multi-target tracking method combining with a result of single-target tracking is designed to resolve a problem in unsupervised anomaly detection. Detection precision is improved by using an average background modeling method, uniform cropping of perspective views, and feature pyramid network-deep cross network (FPN-DCN)-based network re-detection. A spatiotemporal information matrix is constructed by using a track detection result, to estimate an anomaly start time. Further, background modeling and a You Only Look Once version 3 (YOLOv3) method are used to perform abnormal target detection, and train a TrackletNet Tracker (TNT), to extract a track of an abnormal candidate object and estimate an anomaly start time. A detection network is constructed by using mixture of Gaussians (MOG2) background modeling and a faster region-convolutional neural network (R-CNN). A multi-granularity tracking algorithm is proposed, and box-level tracking and pixel-level tracking are separately used to predict an anomaly start time.

However, these methods need to use target tracking to obtain an advanced track feature, which needs to consume a large amount of calculation costs, memory requirements, and time costs. Therefore, it is urgent and necessary to study a method and a system for detecting an abnormal traffic behavior that can reduce calculation costs, improve prediction efficiency, and shorten a detection time.

SUMMARY

In view of the shortcomings of the conventional technology, the present disclosure aims to provide a method and a system for detecting an abnormal traffic behavior, which can improve a speed and performance of detecting a status of an abnormal static vehicle, and can resolve a problem of detecting a traffic anomaly time, to accurately estimate a start time of abnormal behavior.

Specifically, the present disclosure is implemented by the following technical solutions.

According to one aspect, the present disclosure provides a method for detecting an abnormal traffic behavior, including:

performing background modeling and removing a vehicle that moves normally in each frame of a traffic surveillance video from a framework, to enable an abnormal static target vehicle to be retained in a background;

performing perspective view cropping on each frame of background extracted through background modeling, and obtaining, according to a vehicle size, a cropping box used for cropping the traffic surveillance video; performing abnormal target detection on the traffic surveillance video once every first quantity of frames, to detect abnormal target vehicles in a video frame of the traffic surveillance video; and after an abnormal target vehicle is detected, obtaining a cropped picture of the abnormal target vehicle through cropping, and forward or backward cropping the traffic surveillance video, by using a location of the abnormal target vehicle as a center, to obtain a cropped video clip whose space capacity is several times the vehicle size and whose time is a second quantity of frames, for subsequent anomaly time estimation; and performing anomaly start time estimation, abnormal vehicle status detection and abnormal target matching according to a detection result of the abnormal target vehicle, where the abnormal vehicle status detection is to input the cropped picture of the abnormal target vehicle and the cropped video clip to a network model combining twin cross-correlation with pseudo three-dimensional (P3D)-Attention, detect whether an abnormal target in the cropped video clip is in a static state or a driving state, separately label a classification label on the cropped video clip according to a result of the abnormal vehicle status detection, separately mark the cropped video clip as anomaly, driving, or normal, and determine a video frame when abnormal behavior of the abnormal target vehicle occurs; and the abnormal target matching is to input a to-be-matched vehicle picture and the cropped picture of the abnormal target vehicle to the network model combining twin cross-correlation with P3D-Attention, determine whether the to-be-matched vehicle is an abnormal target vehicle, and determine a start time and an end time of abnormal traffic behavior with reference to the video frame that is obtained when the abnormal behavior of the abnormal target vehicle occurs and that is determined in the detection result of the abnormal target vehicle.

Further, the background modeling uses a MOG2 algorithm.

Further, the abnormal target detection uses a YOLOv3 target detection method.

Further, inputs of the abnormal vehicle status detection are the cropped picture of the abnormal target vehicle, and a video clip whose space capacity is twice the vehicle size and whose time is the set second quantity of frames and that is obtained by cropping by using the abnormal target vehicle as the center.

The abnormal vehicle status detection includes: separately extracting a feature map of the input cropped picture of the abnormal target vehicle and a feature map of each frame of the input video clip by using a P3D-Attention module, and improving correlation of important channel features by using P3D-Attention; then fusing the separately extracted feature maps on three selected layers of different receptive field sizes by using twin cross-correlation operations; for results of first two twin cross-correlation operations, fusing, by using a multiply method, feature maps extracted from the input cropped picture and the input video clip after the twin cross-correlation operations with the feature map of each frame of the input video clip extracted by using the P3D-Attention module before cross-correlation; performing pooling by using global average pooling (GAP); and finally directly classifying the input cropped picture of the abnormal target vehicle and the input video clip by using a softmax layer, separately labeling a classification label on the input video clip according to the result of the abnormal vehicle status detection, separately marking the input video clip as anomaly, driving, or normal, and determining the video frame when the abnormal behavior of the abnormal target vehicle occurs.

Further, inputs of the abnormal target vehicle matching are the cropped picture of the abnormal target vehicle and a positive/negative-type picture used for an abnormal target matching model.

The abnormal target vehicle matching includes: separately extracting feature maps of two input pictures by using the P3D-Attention module, and performing a twin cross-correlation operation by using the extracted feature maps of the two inputs; fusing the separately extracted feature maps on three selected layers of different receptive field sizes by using twin cross-correlation operations; obtaining three feature maps of different sizes, and performing a concatenation operation; and finally directly classifying, by using the softmax layer, the input cropped picture of the abnormal target vehicle and the positive/negative-type picture used for the abnormal target matching model, where a classification result is matching or mismatching.

Further, the P3D-Attention module simulates a 3×3×3 convolution in a spatial domain and a time domain respectively by using a 1×3×3 convolution kernel and a 3×1×1 convolution kernel, and decouples the 3×3×3 convolution in time and space; and the P3D-Attention module further includes a dual-channel attention model (DCAM) and a spatial attention module (SAM) that improve correlation of important features.

Further, the DCAM combines the 1×3×3 convolution kernel in the spatial domain with the 3×1×1 convolution kernel in the time domain to form the 3×3×3 convolution, learns a weight of a frame attention module $M_F \in R^{(F \times 1 \times 1 \times 1)}$ to express attention to a frame, and learns a weight of a channel attention module (CAM) $M_C \in R^{(1 \times 1 \times 1 \times C)}$ to express attention to a channel; and F represents a quantity of frames of a feature map $F \in R^{(F \times H \times W \times C)}$, C represents a quantity of channels of the feature map, H represents a height of the feature map, and W represents a width of the feature map.

Further, the SAM learns location information in a weight matrix $M_S \in R^{(1 \times W \times H \times 1)}$ of a single-channel feature map by using a two-dimensional (2D) convolution kernel, to determine importance and correlation of each location in a video feature map; and F represents the quantity of frames of the feature map $F \in R^{(F \times H \times W \times C)}$, C represents the quantity of channels of the feature map, H represents the height of the feature map, and W represents the width of the feature map.

According to another aspect, the present disclosure further provides a system for detecting an abnormal traffic behavior, to implement the foregoing method for detecting an abnormal traffic behavior, including:

a video acquisition and cropping module, configured to acquire a real-time traffic video stream, provide continuous traffic video stream information, display the information on a display module, and transmit the information as input information to a background modeling module;

the background modeling module, used for a reserved interface and configured to perform background modeling and remove a vehicle that moves normally in each frame of a traffic surveillance video from a framework by inputting video stream data in a correct format, to enable an abnormal static target vehicle to be retained in a background;

an abnormal target detection module, configured to perform perspective view cropping on each frame of background extracted through background modeling, and obtain, according to a vehicle size, a cropping box used for cropping the traffic surveillance video; perform abnormal target detection on the traffic surveillance video once every first quantity of frames, to detect abnormal target vehicles in a video frame of the traffic surveillance video; and after an abnormal target vehicle is detected, obtain a cropped picture of the abnormal target vehicle through cropping, and forward or backward crop the traffic surveillance video, by using a location of the abnormal target vehicle as a center, to obtain a cropped video clip whose space capacity is several times the vehicle size and whose time is a second quantity of frames, for subsequent anomaly time estimation;

an anomaly time estimation module, including abnormal vehicle status detection and abnormal target matching, where the abnormal vehicle status detection is to input the cropped picture of the abnormal target vehicle and the cropped video clip to a network model combining twin cross-correlation with P3D-Attention, detect whether an abnormal target in the cropped video clip is in a static state or a driving state, separately label a classification label on the cropped video clip according to a result of the abnormal vehicle status detection, separately mark the cropped video clip as anomaly, driving, or normal, and determine a video frame when abnormal behavior of the abnormal target vehicle occurs; and the abnormal target matching is to input a to-be-matched vehicle picture and the cropped picture of the abnormal target vehicle to the network model combining twin cross-correlation with P3D-Attention, determine whether the to-be-matched vehicle is an abnormal target vehicle, and determine a start time and an end time of abnormal traffic behavior with reference to the video frame that is obtained when the abnormal behavior of the abnormal target vehicle occurs and that is determined in a detection result of the abnormal target vehicle; and a display module, configured to display video information and image information that are input, and abnormal behavior detection location, anomaly time information, and warning information that are output.

Beneficial effects of the method and the system for detecting an abnormal traffic behavior in the present disclosure are as follows:

The method for detecting an abnormal traffic behavior in the present disclosure is a two-stage method for detecting a road traffic abnormal event, and is based on a mechanism combining twin cross-correlation with a P3D-Attention network. The twin cross-correlation is mainly used to: strengthen attention to the abnormal target vehicle, fully fuse a spatio-temporal feature and an abnormal target feature, pay attention to a specific target (for example, an abnormal static vehicle, used as the abnormal target vehicle), and learn a status detection method and an image comparison method that are for the abnormal target vehicle, to improve a speed and performance of detecting a status of the abnormal target vehicle, resolve a problem of detecting a time of the abnormal traffic behavior, thereby accurately estimating the start time of the abnormal traffic behavior. Based on decoupling of the spatial convolution and the temporal convolution by a P3D module, the P3D-attention module is separately fused with an adaptive SAM and an adaptive DCAM. This fully fuses the spatio-temporal features, improves the correlation of the important channel features, and increases global correlation of the feature map, thereby improving prediction performance for a vehicle with abnormal behavior. On a related dataset, anomalies in a same video are fused to obtain a final anomaly result. An experimental result shows that the method for detecting an abnormal traffic behavior in the present disclosure is valid in various traffic video scenarios. An F1 score of the abnormal target detection is 0.9705, a root mean square error (RMSE) of the anomaly time estimation is 9.22, and an average detection time of a video of 12 frames is 12.2 ms. In comparison with 342 ms obtained by using a tracking track method, the method consumes less and is superior in time efficiency.

BRIEF DESCRIPTION OF THE DRAWINGS

FIG. 2A shows a video in a camera scenario, FIG. 2B shows videos in different jitter camera scenarios generated by randomly cropping FIG. 2A, and FIG. 2C shows a target block generated according to FIG. 2B;

DETAILED DESCRIPTION OF THE EMBODIMENTS

The present disclosure is further described in more detail below with reference to embodiments and accompanying drawings.

Embodiment 1

An embodiment of the present disclosure provides a method for detecting an abnormal traffic behavior. Based on a mechanism combining twin cross-correlation with a P3D-Attention network, the method can be used to accurately estimate a start time and an end time of abnormal behavior of road traffic.

Figure 1:
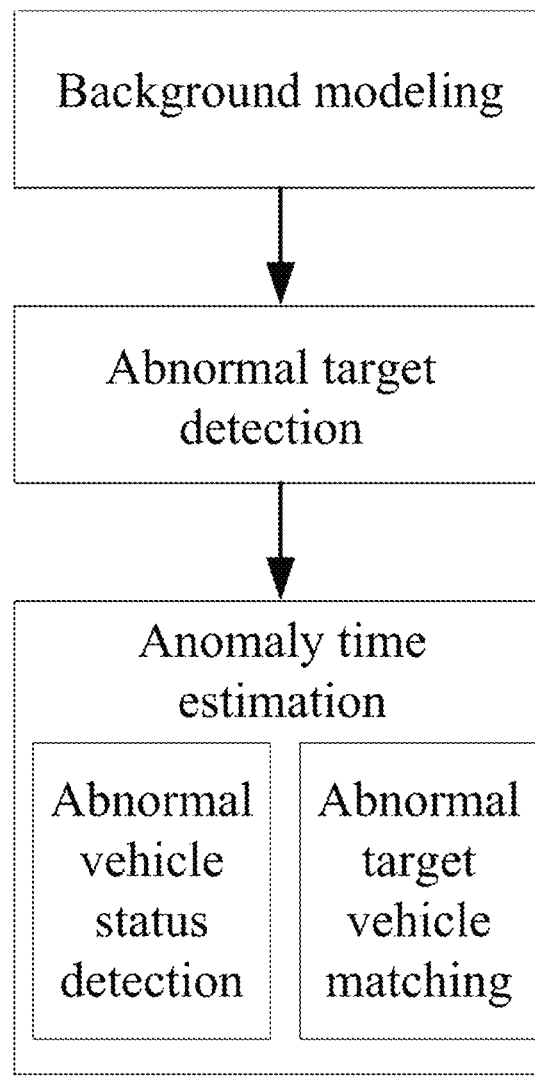
FIG. 1 is a flow chart of Embodiment 1 according to the present disclosure.

As shown in FIG. 1, input of the method for detecting an abnormal traffic behavior in this embodiment is a traffic surveillance video shot by a camera. The detection method includes the following steps:

1. Retain an abnormal target vehicle in a background through background modeling.

The abnormal target vehicle is an abnormal static target vehicle. A vehicle that moves normally in each frame of the traffic surveillance video is removed from a framework through background modeling, to enable the abnormal static target vehicle to be retained in the background.

A background modeling method usually includes a moving average background modeling method and a MOG2 algorithm. The MOG2 algorithm is an adaptive algorithm based on Gaussian mixture probability density. A recursive equation is used to continuously update a parameter, and select an appropriate Gaussian mixture model (GMM) component for each pixel. The GMM component is gradually updated in a relatively long period of time, for having better adaptability to different scenarios. In a background of congested small targets and a road background of a slow vehicle speed, the moving average background modeling method is less effective than the MOG2 algorithm. In addition, in a congested traffic flow, more moving vehicle information is retained in a modeled background according to the moving average background modeling method, and consequently false detection occurs to a static vehicle when a method for detecting a status of an abnormal target vehicle is subsequently performed. In addition, in a camera shaking scenario, the MOG2 algorithm is more stable than the moving average background modeling method. Therefore, in the present disclosure, the MOG2 algorithm is used to retain the abnormal target vehicle in the background.

In this embodiment, in a surveillance video, a quantity of frames transmitted in the video per second is 30 frames, an update interval of the MOG2 algorithm is set to 120 frames, and in this case, it takes 4s to detect a status of an abnormal target vehicle on a video of 120 frames. In this case, all vehicles that move normally are removed from a framework, and a static vehicle is still retained in the background.

A vehicle that moves normally in each frame of the traffic surveillance video is removed from the framework through background modeling, to enable the abnormal static target vehicle to be retained in the background. However, background modeling may cause a delay of vehicle appearance modeling. For example, forward background modeling may cause a static vehicle to be displayed in the background after a period of time when anomaly stationary occurs, and a delayed anomaly start time is obtained. To obtain an accurate anomaly start time, the delayed anomaly start time may be first obtained through background modeling, and then a raw image is analyzed through backtracking to obtain more accurate time positioning. Therefore, in the present disclosure, abnormal target detection needs to be further performed on the background to obtain a cropped picture of the abnormal target vehicle and a cropped video, which are input to the network model combining twin cross-correlation with P3D-Attention for anomaly time estimation, to obtain an accurate anomaly start time and end time.

2. Perform the abnormal target detection on the background to obtain the cropped picture of the abnormal target vehicle and the cropped video.

Perspective view cropping is performed on each frame of background extracted through background modeling in the traffic surveillance video, and a cropping box used for cropping the surveillance video is obtained according to a vehicle size. For each frame of the traffic surveillance video, the background is detected once every specified first quantity of frames (for example, 30 frames) by using an abnormal target detection method, to detect abnormal target vehicles in a video frame. After an abnormal target vehicle is detected, a video clip whose space capacity is twice the vehicle size and whose time is a second quantity of frames (for example, 12 frames) is obtained by forward (or backward) cropping by using a location of the abnormal target vehicle as a center, for subsequent anomaly time estimation.

The abnormal target detection method that can be used includes universal target detection methods such as YOLOv3 and Faster-RCNN. Preferably, a YOLOv3 target detection method is used in the present disclosure.

Figure 2A:
FIG. 2A to FIG. 2C are schematic diagrams of cropped videos at a jitter perspective according to the present disclosure, where
Figure 2B:
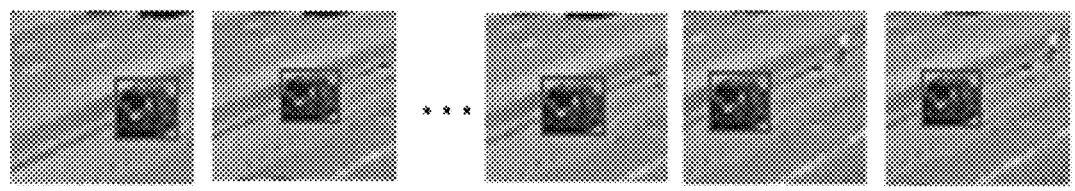
Figure 2C:
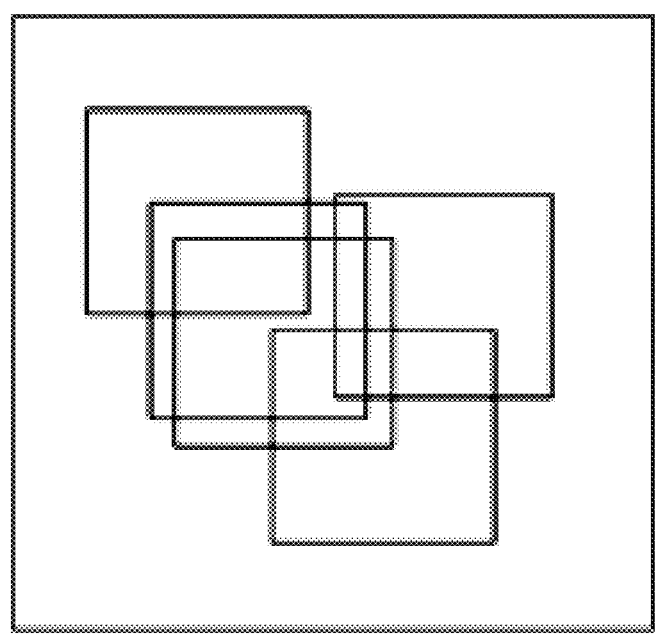

For a video, in addition to a problem of detection difficulty of a small target, there is a problem of a camera jitter. To properly distinguish the abnormal target vehicle that is abnormal and static from a driving-starting vehicle, videos in different jitter camera scenarios are generated in a form of random cropping in the present disclosure, as an analog jitter dataset. A manner of random cropping is to crop according to a jitter magnitude, and to crop according to whether a jitter is random or a jitter back and forth. The jitter amplitude is separately set to a capacity of half a vehicle, a capacity of one vehicle, or the like, as shown in FIGS. 2A-C. Preferably, considering that there is extremely little data of the abnormal target vehicle cropped from the video, to prevent over-fitting caused by a learning bias of the network model combining twin cross-correlation with P3D-Attention, several data samples of different quantities (for example, more than 4000) of vehicles are created by using a target tracking algorithm.

3. Input the cropped picture of the abnormal target vehicle and the cropped video to the network model combining twin cross-correlation with P3D-Attention for anomaly time estimation, to obtain the accurate anomaly start time and end time.

The anomaly time estimation uses the constructed network model combining twin cross-correlation with P3D-Attention, to perform abnormal vehicle status detection and abnormal target matching on the input picture and the input video.

A task of the abnormal vehicle status detection is mainly to detect whether the abnormal target vehicle in the input video clip is in a static state or a driving state, separately label a classification label on the video clip according to a result of the abnormal vehicle status detection, separately mark the video clip as anomaly, driving, or normal, and determine a video frame when abnormal behavior of the abnormal target vehicle occurs. When the abnormal behavior occurs, it is a moment of change of two states of driving and stationary.

(1) Anomaly: The abnormal target vehicle stagnates on a road, and a non-abnormal target vehicle runs normally. In this case, it is marked as anomaly.

(2) Driving: The abnormal target vehicle is in a normal driving state.

(3) Normal: No abnormal target vehicle stagnates on the road, but states in which another normal vehicle passes by and there is no vehicle on the road are included.

A task of the abnormal target vehicle matching is to assist the abnormal vehicle status detection, determine, through picture matching, whether a to-be-matched vehicle is an abnormal target vehicle, and determine a start time and an end time of the abnormal traffic behavior with reference to the video frame in which the abnormal target vehicle is located when the abnormal behavior occurs and that is determined in a detection result of the abnormal target vehicle.

There are three inputs corresponding to the network model combining twin cross-correlation with P3D-Attention proposed in the present disclosure: First is the cropped picture of the abnormal target vehicle, second is the video clip whose space capacity is twice the vehicle size and whose time is the set second quantity of frames (for example, 12 frames) and that is obtained by cropping by using the abnormal target vehicle as the center, and third is a positive/negative-type picture used for the abnormal target matching.

In a neural network, a convolution operation is essentially a cross-correlation operation, and has a feature of weight sharing. To be specific, all nodes at a same layer based on a convolutional neural network (CNN) share a same connection weight.

Figure 3:
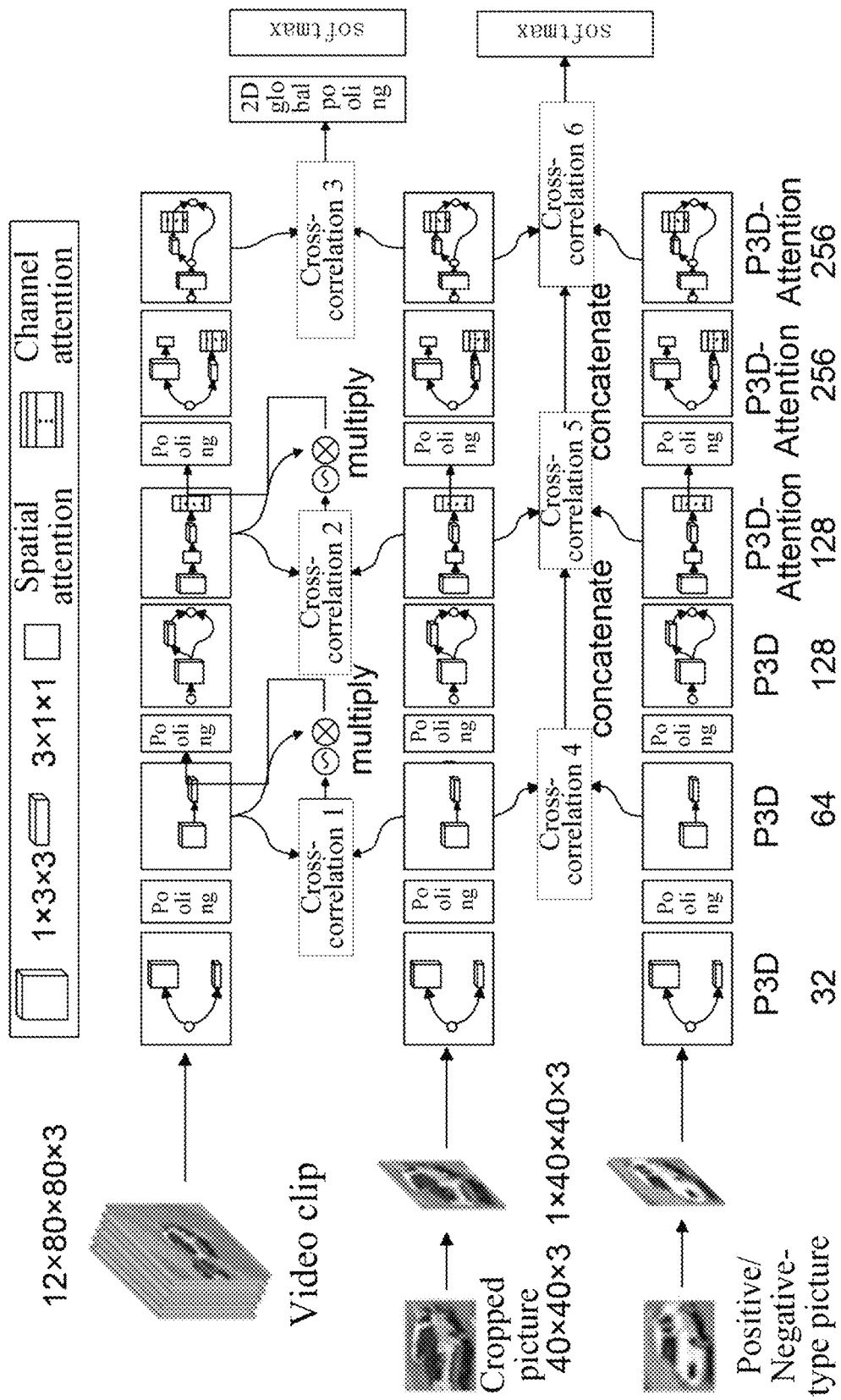
FIG. 3 is a schematic diagram of a network model combining twin cross-correlation with P3D-Attention according to the present disclosure.

In the network model combining twin cross-correlation with P3D-Attention of the present disclosure, a main body is based on a P3D-Attention network structure, and a cross-correlation mechanism is integrated into the P3D-Attention network structure, as shown in FIG. 3. In a twin cross-correlation structure, features of a picture and a video are extracted by performing a depthwise cross-correlation operation. A feature map is a feature extracted from the input picture or the input video by using a convolution kernel operation of the twin cross-correlation in the network model combining twin cross-correlation with P3D-Attention. In this embodiment, inputs of the network model combining twin cross-correlation with P3D-Attention are two pictures of 40×40×3 (width×height×a quantity of channels) and a video of 30×80×80×3 (a quantity of frames×width×height×a quantity of channels). In addition, the three are extracted features by using a P3D-Attention backbone network, that is, the backbone network of the three inputs shares a weight.

Figure 5:
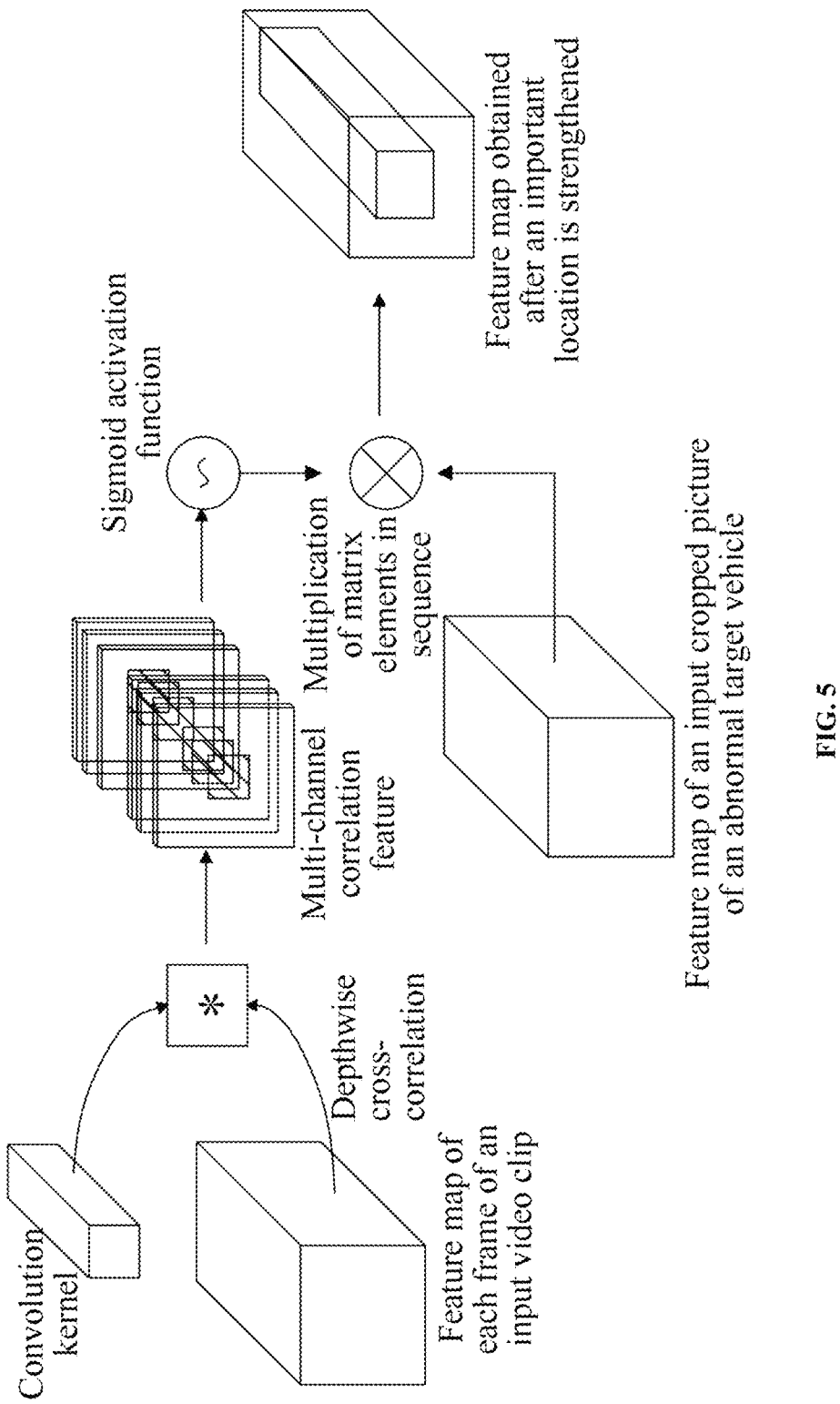
FIG. 5 is a schematic principle diagram of a depthwise cross-correlation mechanism according to the present disclosure.

Inputs of the task of the abnormal vehicle status detection are the cropped picture of the abnormal target vehicle (for example, 40×40×3 (width×height×a quantity of channels)), and the video clip whose space capacity is twice the vehicle size and whose time is the set second quantity of frames (for example, 12 frames, 12×80×80×3 (a quantity of frames× width×height×a quantity of channels)) and that is obtained by cropping by using the abnormal target vehicle as the center. Every specified first quantity of frames (for example, 30 frames), the abnormal vehicle status detection is performed on a video that includes an abnormal target and that is in an abnormal target detection result. First, a feature map of an input template picture and a feature map of each frame of the input video are separately extracted by using a P3D-Attention module, and correlation of important channel features is improved by using P3D-Attention. Then, the separately extracted feature maps are fused on three selected layers of different receptive field sizes by using twin cross-correlation operations (for example, cross-correlation 1, cross-correlation 2, and cross-correlation 3 in FIG. 3). Preferably, the twin cross-correlation operation uses a cross-correlation operation of a Siamese fully-convolutional (SiamFC) model. For results of first two twin cross-correlation operations, fusion is performed, by using a multiply method, on feature maps extracted from the input cropped picture and the input video clip after the twin cross-correlation operation and a video feature map extracted by using the P3D-Attention module before cross-correlation. Pooling is performed by using global average pooling (GAP) instead of a full concatenation layer. Finally, the input cropped picture of the abnormal target vehicle and the input video clip are directly classified by using a softmax layer. The multiply method is used to fuse the feature maps extracted from the input cropped picture and the input video clip after the twin cross-correlation operation with the video feature map extracted by using the P3D-Attention module before the cross-correlation. This is similar to a spatial attention mechanism. A difference lies in that the spatial attention mechanism fits, by using gradient descent, a part that needs to be paid attention in network learning, but an input of a concerned part of a twin cross-correlation mechanism is a feature map extracted from a cropped picture of a preset abnormal target vehicle by using the P3D-Attention module. The extracted feature map is used as an input of a convolution kernel of the depthwise cross-correlation operation, to enhance a feature matching the cropped picture of the abnormal target vehicle with the input video, and directly enhance an important location by using the network model combining twin cross-correlation and P3D-Attention, as shown in FIG. 5. GAP makes conversion between feature maps and a final classification simpler and more natural, which is different form that a large quantity of trained and optimized parameters are required at the full concatenation layer. This reduces a spatial parameter to make the model more robust, and has a better anti-over-fitting effect. GAP is used to replace a network of the full concatenation layer. Usually, there is still good prediction performance. In addition, over-fitting of the model can be prevented, and a calculation amount of model training can be greatly reduced.

Inputs of the task of the abnormal target vehicle matching is the cropped picture of the abnormal target vehicle (for example, 40×40×3 (width×height×a quantity of channels)), and a positive/negative-type picture of an abnormal target matching model (for example, 40×40×3 (width×height×a quantity of channels)). Feature maps of the two input pictures are separately extracted by using the P3D-Attention module, and a twin cross-correlation operation is performed by using the extracted feature maps of the two inputs. The separately extracted feature maps are still fused at three selected layers of different receptive field sizes by using twin cross-correlation operations (for example, cross-correlation 4, cross-correlation 5, and cross-correlation 6 in FIG. 3). The twin cross-correlation operation uses a VALID type, that is, the cross-correlation operation is performed without adding padding, to obtain feature maps of 1×1×1×64, 1×1×1×128, and 1×1×1×256 sizes, and a concatenation operation is performed. The concatenation operation is to concatenate tensors along a specified dimension. Finally, the input cropped picture of the abnormal target vehicle and the positive/negative-type picture used for the abnormal target matching model are directly classified by using the softmax layer, and a classification result is matching or mismatching.

(1) Matching: Each pair of matched pictures are cropped pictures of a same vehicle at different times.

(2) Mismatching: The template picture is the cropped picture of the abnormal target vehicle. A mismatched picture may be a picture that is of another vehicle and that is in the positive/negative-type picture used for the abnormal target matching model or any image that may appear in a traffic road scenario. Considering that the task is to determine a vehicle static time, if an intersection over union (IOU) of a same vehicle is less than 0.7, it is considered as mismatching.

In the second task, a distance function is not used to calculate a similarity between the pictures in the cross-correlation operation, but the depthwise cross-correlation operation that is the same as SiamFC is used. The depthwise cross-correlation operation is performed on feature maps of a same shape size, features of different scales are aggregated by using a concatenation method, and classification is performed.

After all inputs are processed to obtain start times and end times of all anomalies, anomaly fusion is performed. To be specific, anomalies whose anomaly times intersect with each other are considered as a same anomaly. For example, anomalies whose time interval is less than 5 seconds and IOU is greater than 0.5 are considered as a same anomaly.

Figure 4:
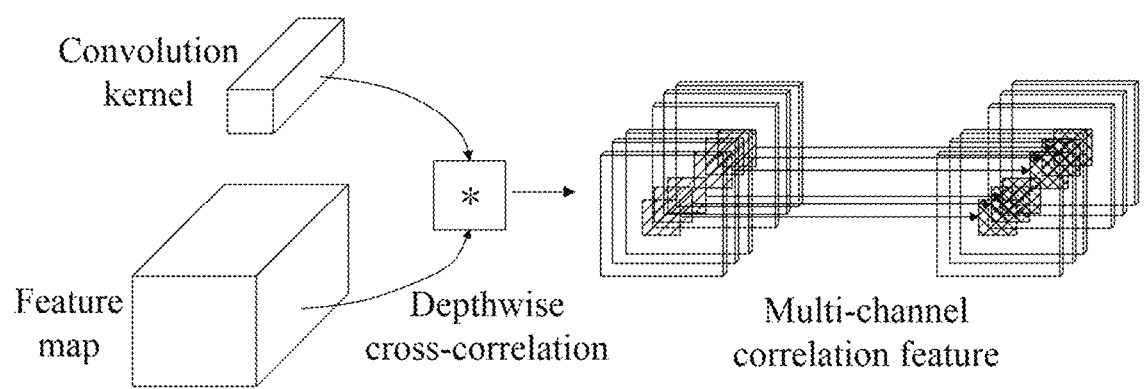
FIG. 4 is a schematic diagram of a depthwise cross-correlation operation according to the present disclosure.

Each convolution kernel of a conventional cross-correlation operation simultaneously operates channels of the input picture. In the present disclosure, the depthwise cross-correlation operation is selected. One convolution kernel of the depthwise cross-correlation operation is only responsible for one channel. The cross-correlation operation is only performed on one channel and a corresponding convolution kernel, to obtain an output whose feature channel quantity is not 1, for retaining more features. An operation description is shown in FIG. 4, and * is the depthwise cross-correlation operation.

Construction of the network model combining twin cross-correlation with P3D-Attention shown in FIG. 3 specifically includes the following steps.

Step 3.1: A P3D-Attention network adjusts two types of inputs.

A backbone network for extracting the feature in the present disclosure is the P3D-Attention network. When twin cross-correlation is integrated with the P3D-Attention network, a 2D convolution operation needs to be replaced with a 3D convolution operation. The P3D-Attention network simulates a 3×3×3 convolution in a spatial domain and a time domain respectively by using a 1×3×3 convolution kernel and a 3×1×1 convolution kernel, and decouples the 3×3×3 convolution in time and space. The P3D-Attention network further includes a dual-channel attention mechanism and a spatial attention mechanism, to improve correlation of important features.

The two types of inputs of the network model combining twin cross-correlation with P3D-Attention respectively are a picture and a video. The picture includes the cropped picture of the abnormal target vehicle and the positive/negative-type picture used for the abnormal target matching model, for example, a picture of 40×40×3 (width×height×a quantity of channels, that is, H×W×C). The video is a video clip whose space capacity is twice the vehicle size and whose time is the second quantity of frames and that is obtained by cropping by using the abnormal target vehicle as the center, for example, a video of 12×80×80×3 (a quantity of frames× width×height×a quantity of channels, that is, F×H×W×C). Features of the two types of inputs are extracted by using the P3D-Attention backbone network, that is, the two inputs of the abnormal vehicle status detection and the two inputs of the abnormal target matching shares a weight. When the two inputs simultaneously pass through a same network, picture sizes are different (80:40) and input dimensions are also different (4:3), and therefore a network structure needs to be adjusted when attention mechanisms are combined.

The picture (for example, the picture of 40×40×3 (H×W× C)) needs to be adjusted as data added with a time dimension (for example, 12×80×80×3 (F×H×W×C)), to adapt to a convolutional operation on a video dimension. However, there is still a case in which sizes of time dimensions are different (12:1). In view of this, a structure implementation of the network model combining twin cross-correlation with P3D-Attention needs to be separately adjusted in a P3D module and an Attention module.

For the P3D module, a difference in picture sizes is not a problem. A convolution operation can be performed for the two types of inputs on the 1×3×3 convolution kernel. However, for a difference in the sizes of the time dimensions, an operation on the 3×1×1 convolution kernel needs to be ignored when a picture input of 1×40×40×3 (F×H× W×C) is executed, because a convolutional size of 3 is not significant for a picture with only one time dimension.

The Attention module uses a DCAM and an SAM to apply attention to a time frame and a space frame to strengthen key frames, automatically assigns different attention to different joint points according to the feature map, focuses on locations mentioned in the prior knowledge, and removes interference of a background and noise on recognition. For details, refer to step 3.2. The attention mechanism is expressed as:

$$F'=M(F)\otimes F \quad (1)$$

In the equation, M represents the attention model, F represents the feature map, and ⊗ represents multiplication of matrix elements in sequence.

Step 3.2: The DCAM and the SAM perform adjustment.

The P3D-Attention network, which combines a P3D convolutional neural network and the attention mechanism, uses the P3D-Attention module to apply attention to the channel and the feature map by using the attention mechanism, and includes the DCAM and the SAM.

The DCAM applies attention between video frames and to a channel of each frame. For a feature map $F \in R^{(F \times H \times W \times C)}$, F in R represents a frame, C represents a quantity of channels of a feature map in each frame, H represents a height of the feature map, and W represents a width of the feature map. A weight of $M \in R^{(F \times 1 \times 1 \times C)}$ is learned to determine importance of each channel, a feature map of (F, H, W, C) is transposed to (H, W, F×C), to be embedded into a 2D SAM, and a weight of $M_F \in R^{(F \times 1 \times 1 \times 1)}$ and the weight of $M_C \in R^{(1 \times 1 \times 1 \times C)}$ are respectively learned to respectively express attention to the frame and the channel.

The SAM is implemented by using a convolutional block attention module (CBAM), and focuses on a spatial feature by learning a weight map in a spatial dimension. A feature map $F \in R^{(F \times H \times W \times C)}$ of each frame of the video is used as an example. The SAM mainly learns location information in a weight matrix $M_S \in R^{(1 \times W \times H \times 1)}$ of a single-channel feature map by using a 2D convolution kernel, to determine importance and correlation of each location in a video feature map. A size of the convolution kernel is unrelated to a size of the feature map, so that both a video feature and a picture feature can be directly cascaded to the SAM to improve correlation of important locations.

The P3D model decouples a 3D convolution into a spatial convolution and a temporal convolution, and on this basis, the attention model is divided into the following three different P3D-attention models to implement the network model.

P3D-Attention-A:

A one-dimensional (1D) temporal convolution kernel T is cascaded to a 2D spatial convolution kernel S. An SAM is cascaded after S, and a CA model is cascaded after T, to implement a P3D-attention-A architecture. The 1D temporal convolution kernel T is directly connected to a final output, as shown in Equation (2):

$$(CA \cdot T \cdot SA \cdot S) \cdot X_t = CA(T(SA(S(X_t)))) = X_{t+1} \quad (2)$$

$X_t$ represents an input feature map, $X_{t+1}$ represents an output after applying the attention mechanism, and $X_t$ and $X_{t+1}$ have a same feature dimension.

P3D-Attention-B:

An original P3D-B uses an indirect influence between two convolution kernels, so that the two convolution kernels process convolution features in parallel. After a residual unit (RU) is removed, an SAM is cascaded after S, and a CA model is cascaded after T, which is expressed as:

$$(SA \cdot S + CA \cdot T) \cdot X_t = SA(S(X_t)) + CA(T(X_t)) = X_{t+1} \quad (3)$$

P3D-Attention-C:

An original P3D-C model is a compromise between P3D-A and P3D-B, through which a direct influence between the final output and each of S and T is simultaneously established. To achieve a direct connection between S and the final output based on the cascaded P3D-A architecture, an attention model is added to construct P3D-attention-C, which is expressed as:

$$(SA \cdot S + CA \cdot T \cdot SA \cdot S) \cdot X_t = SA(S(X_t)) + CA(T(SA(S(X_t)))) = X_{t+1} \quad (4)$$

Figure 6:
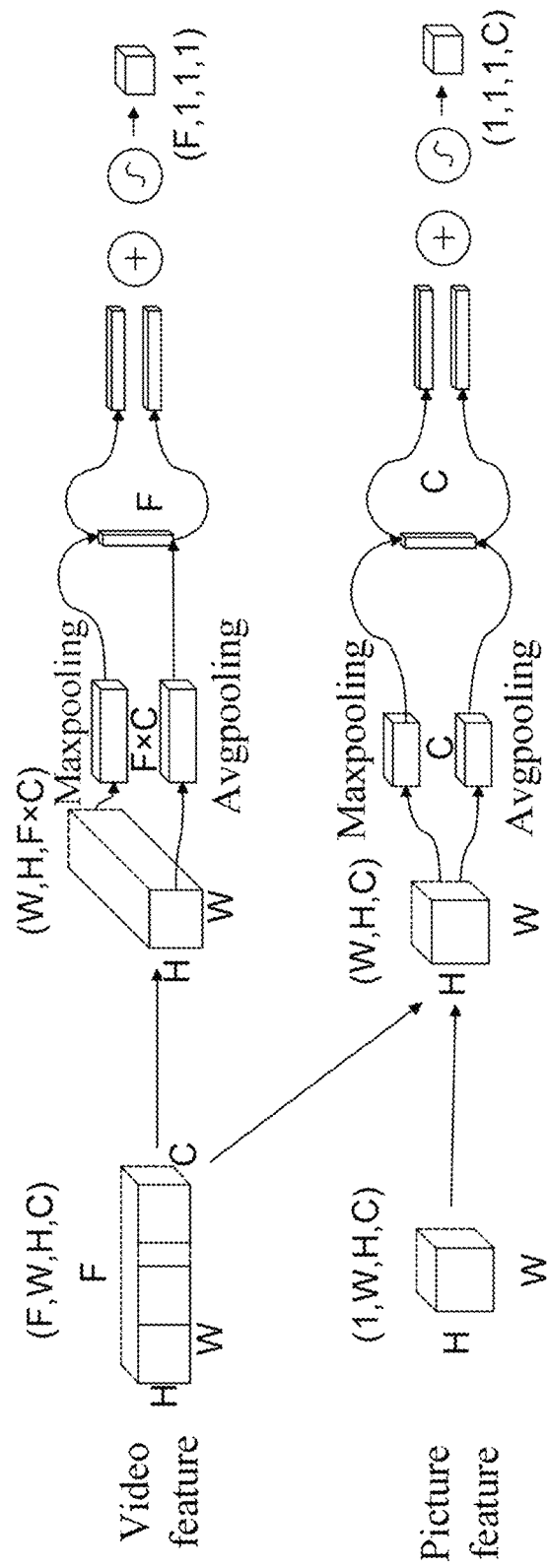
FIG. 6 shows an adjusted dual-channel attention mechanism according to the present disclosure.

To adapt to fusion of a twin network and the attention mechanism, corresponding adjustment needs to be performed on different input branches. An adjusted dual-channel attention mechanism is shown in FIG. 6. The feature map $F \in R^{(F \times H \times W \times C)}$ is used as an example. In the present disclosure, to adapt to the 3D convolution, the DCAM is constructed, to combine the 1×3×3 convolution kernel in the spatial domain with the 3×1×1 convolution kernel in the time domain to form the 3×3×3 convolution, learn a weight of a frame attention module $M_F \in R^{(F \times 1 \times 1 \times 1)}$ to express attention to a frame, and learn a weight of a channel attention module $M_C \in R^{(1 \times 1 \times 1 \times C)}$ to express attention to a channel.

For the attention to a frame, that is, learning $M_F \in R^{(F \times 1 \times 1 \times 1)}$, a feature map of (F, H, W, C) needs to be transposed as (H, W, F×C), and H and W in the spatial dimension are eliminated through maximum pooling (maxpooling) and average pooling (avgpooling). Maxpooling can extract a feature texture, to reduce impact of useless information. Avgpooling can retain background information. In this case, dimensions of the two inputs (the picture and the video) after being pooled are different, which are respectively F×C and 1×C. Therefore, when an attention mechanism of a frame of the picture input is executed, an attention operation on the frame is ignored in the present disclosure.

For attention to a channel to which each frame belongs, that is, learning $M_C \in R^{(1 \times 1 \times 1 \times C)}$. F in the time dimension may be directly pooled and eliminated, and dimensions obtained after the two inputs of the picture and the video are pooled are the same (C: C). Therefore, when an attention mechanism of a picture channel of the picture input is executed, an attention operation on the picture channel is ignored in the present disclosure.

According to the method for detecting an abnormal traffic behavior in the present disclosure, an RMSE of the anomaly time estimation is 9.22, and an average detection time of the video of 12 frames is 12.2 ms, which has a great advantage in time efficiency.

According to the method for detecting an abnormal traffic behavior in the present disclosure, the anomaly time estimation uses a combination of the abnormal vehicle status detection and the abnormal target matching, and uses multi-task training. Two input pictures and one input video are respectively input to one branch of the network model combining twin cross-correlation with P3D-Attention. The three branches have a same structure and share a same parameter. A network tail uses two softmax layers as results of two classification tasks. The network model combining twin cross-correlation with P3D-Attention is based on parameter sharing, and performs multi-task learning on an abnormal vehicle status detection method and an image matching method based on the twin network. By predicting the location and the status of the vehicle and by using an abnormal target matching method, a frame in which the anomaly start time is located is further accurately positioned, which can well resolve a problem of estimating a start time of a traffic anomaly, and accurately estimate the start time of the abnormal behavior.

Still further, the entire network model combining twin cross-correlation with P3D-Attention is a convolutional neural network architecture. To reduce model misjudgment during training, the present disclosure evaluates model performance by using F1-Score rather than an accuracy rate. F1-Score, also known as balanced F score, is defined as a harmonic average of precision P and a recall rate R.

P refers to an accuracy rate.

$$P = TP/FP + TP \quad (5)$$

In the equation, TP represents a positive sample, that is, a classifier determines a positive example and determining is true; and FP indicates that the classifier determines a positive example but determining is false.

R refers to a recall rate.

$$R = TP/TP + FN \quad (6)$$

In the equation, FN indicates that the classifier determines a negative example but determining is false.

F1-score is the harmonic average of precision and a recall rate.

$$F1 = 2 \times P \times R/P + R \quad (7)$$

Embodiment 2

Another embodiment of the present disclosure provides a system for detecting an abnormal traffic behavior, including:
a video acquisition and cropping module, configured to acquire a real-time traffic video stream, provide continuous traffic video stream information, display the information on a display module, and transmit the information as input information to a background modeling module;
the background modeling module, used for a reserved interface and configured to remove a vehicle that moves normally in each frame of a traffic surveillance video from a framework through background modeling by inputting video stream data in a correct format, to enable an abnormal static target vehicle to be retained in a background;
an abnormal target detection module, configured to perform perspective view cropping on each frame of background extracted through background modeling, and obtain, according to a vehicle size, a cropping box used for cropping the traffic surveillance video; perform abnormal target detection on the traffic surveillance video once every first quantity of frames, to detect abnormal target vehicles in a video frame of the traffic surveillance video; and after an abnormal target vehicle is detected, obtain a cropped picture of the abnormal target vehicle through cropping, and forward or backward crop the traffic surveillance video, by using a location of the abnormal target vehicle as a center, to obtain a cropped video clip whose space capacity is twice the vehicle size and whose time is a second quantity of frames, for subsequent anomaly time estimation;
an anomaly time estimation module, including abnormal vehicle status detection and abnormal target matching, where the abnormal vehicle status detection is to input the cropped picture of the abnormal target vehicle and the cropped video clip to a network model combining twin cross-correlation with P3D-Attention, detect whether an abnormal target in the cropped video clip is in a static state or a driving state, separately label a classification label on the cropped video clip according to a result of the abnormal vehicle status detection, separately mark the cropped video clip as anomaly, driving, or normal, and determine a video frame when abnormal behavior of the abnormal target vehicle occurs; and the abnormal target matching is to input a to-be-matched vehicle picture and the cropped picture of the abnormal target vehicle to the network model combining twin cross-correlation with P3D-Attention, determine whether the to-be-matched vehicle is an abnormal target vehicle, and determine a start time and an end time of abnormal traffic behavior with reference to the video frame that is obtained when the abnormal behavior of the abnormal target vehicle occurs and that is determined in a detection result of the abnormal target vehicle; and a display module, configured to display video information and image information that are input, and abnormal behavior detection location, anomaly time information, and warning information that are output.

In some embodiments, some aspects of the technique described above may be implemented by one or more processors of a processing system executing software. The software includes stores or tangibly implements in other ways one or more executable instruction sets on a non-transient computer-readable storage medium. The software may include instructions and some data which, when executed by the one or more processors, manipulate the one or more processors to perform one or more aspects of the technique described above. The non-transient computer-readable storage medium may include, for example, a magnetic or optical disk storage device, solid-state storage devices such as a flash memory, a cache, and a random access memory (RAM), or other nonvolatile memory devices. Executable instructions stored on the non-transient computer-readable storage medium may be source code, assembly language code, target code, or other instruction formats explained or executed in other ways by one or more processors.

The computer-readable storage medium may include any storage medium accessible by a computer system to provide instructions and/or data to the computer system during use or a combination of storage mediums. Such a storage medium may include but be not limited to an optical medium (for example, a compact disc (CD), a digital versatile disc (DVD), or a blue-ray disc), a magnetic medium (for example, a floppy disc, a magnetic tape, or a magnetic hard drive), a volatile memory (for example, a RAM or a cache), a nonvolatile memory (for example, a read-only memory (ROM) or a flash memory), or a storage medium based on a micro electro mechanical system (MEMS). The computer-readable storage medium may be embedded in a computing system (for example, a system RAM or ROM), fixedly attached to a computing system (for example, a magnetic hard drive), removably attached to a computing system (for example, a CD or a flash memory based on a universal serial bus (USB)), or coupled to a computer system via a wired or wireless network (for example, network accessible storage (NAS)).

It needs to be noted that not all acts or elements in the above general description are essential and a part of a specific act or device may be not essential. Moreover, one or more further acts or included elements may be performed in addition to those described. Still further, the sequence of acts listed is not necessarily the sequence of performing them. Moreover, these concepts have been described with reference to specific embodiments. However, those of ordinary skill in the art understand that various modifications and changes may be made without departing from the scope of the present disclosure set forth in the claims. Therefore, the description and the accompanying drawings are considered to be illustrative rather than limiting, and all such modifications are included within the scope of the present disclosure.

Benefits, other advantages and solutions to problems have been described above with respect to specific embodiments. However, benefits, advantages and solutions to problems that may cause any benefit, advantage or solution to occur or become more apparent and any feature should not be construed as critical or necessary features for any or other aspects or essential features for any or all claims. Moreover, the specific embodiments described above are merely illustrative because the disclosed subject matter may be modified and implemented in such a manner that is apparently different but equivalent for those skilled in the art who benefit from the teaching herein. In addition to those described in the claims, it is not intended to limit constructions shown herein or designed details. Therefore, it is obvious that the specific embodiments disclosed above may be changed or alternated and all such changes are considered to be within the scope of the disclosed subject matter.

What is claimed is:

1. A method for detecting an abnormal traffic behavior, comprising:

performing background modeling and removing a vehicle that moves normally in each frame of a traffic surveillance video from a framework, to enable an abnormal static target vehicle to be retained in a background;

performing perspective view cropping on each frame of background extracted through background modeling, and obtaining, according to a vehicle size, a cropping box used for cropping the traffic surveillance video; performing abnormal target detection on the traffic surveillance video once every first quantity of frames, to detect abnormal target vehicles in a video frame of the traffic surveillance video; and after an abnormal target vehicle is detected, obtaining a cropped picture of the abnormal target vehicle through cropping, and forward or backward cropping the traffic surveillance video, by using a location of the abnormal target vehicle as a center, to obtain a cropped video clip whose space capacity is several times the vehicle size and whose time is a second quantity of frames, for subsequent anomaly time estimation; and performing anomaly start time estimation, abnormal vehicle status detection and abnormal target matching according to a detection result of the abnormal target vehicle, wherein the abnormal vehicle status detection is to input the cropped picture of the abnormal target vehicle and the cropped video clip to a network model combining twin cross-correlation with pseudo three-dimensional (P3D)-Attention, detect whether an abnormal target in the cropped video clip is in a static state or a driving state, separately label a classification label on the cropped video clip according to a result of the abnormal vehicle status detection, separately mark the cropped video clip as anomaly, driving, or normal, and determine a video frame when abnormal behavior of the abnormal target vehicle occurs; and the abnormal target matching is to input a to-be-matched vehicle picture and the cropped picture of the abnormal target vehicle to the network model combining twin cross-correlation with P3D-Attention, determine whether the to-be-matched vehicle is an abnormal target vehicle, and determine a start time and an end time of abnormal traffic behavior with reference to the video frame that is obtained when the abnormal behavior of the abnormal target vehicle occurs and that is determined in the detection result of the abnormal target vehicle.

2. The method for detecting an abnormal traffic behavior according to claim 1, wherein the background modeling uses a mixture of Gaussians (MOG2) algorithm.

3. The method for detecting an abnormal traffic behavior according to claim 1, wherein the abnormal target detection uses a You Only Look Once version 3 (YOLOv3) target detection method.

4. The method for detecting an abnormal traffic behavior according to claim 1, wherein inputs of the abnormal vehicle status detection are the cropped picture of the abnormal target vehicle, and a video clip whose space capacity is twice the vehicle size and whose time is the set second quantity of frames and that is obtained by cropping by using the abnormal target vehicle as the center; and the abnormal vehicle status detection comprises: separately extracting a feature map of the input cropped picture of the abnormal target vehicle and a feature map of each frame of the input video clip by using a P3D-Attention module, and improving correlation of important channel features by using P3D-Attention; then fusing the separately extracted feature maps on three selected layers of different receptive field sizes by using twin cross-correlation operations; for results of first two twin cross-correlation operations, fusing, by using a multiply method, feature maps extracted from the input cropped picture and the input video clip after the twin cross-correlation operations with the feature map of each frame of the input video clip extracted by using the P3D-Attention module before cross-correlation; performing pooling by using global average pooling (GAP); and finally directly classifying the input cropped picture of the abnormal target vehicle and the input video clip by using a softmax layer, separately labeling a classification label on the input video clip according to the result of the abnormal vehicle status detection, separately marking the input video clip as anomaly, driving, or normal, and determining a video frame in which an anomaly time point is located.

5. The method for detecting an abnormal traffic behavior according to claim 4, wherein inputs of the abnormal target vehicle matching are the cropped picture of the abnormal target vehicle and a positive/negative-type picture used for an abnormal target matching model; and the abnormal target vehicle matching comprises: separately extracting feature maps of two input pictures by using the P3D-Attention module, and performing a twin cross-correlation operation by using the extracted feature maps of the two inputs; fusing the separately extracted feature maps on three selected layers of different receptive field sizes by using twin cross-correlation operations; obtaining three feature maps of different sizes, and performing a concatenation operation; and finally directly classifying, by using the softmax layer, the input cropped picture of the abnormal target vehicle and the positive/negative-type picture used for the abnormal target matching model, wherein a classification result is matching or mismatching.

6. The method for detecting an abnormal traffic behavior according to claim 4, wherein the P3D-Attention module simulates a 3×3×3 convolution in a spatial domain and a time domain respectively by using a 1×3×3 convolution kernel and a 3×1×1 convolution kernel, and decouples the 3×3×3 convolution in time and space; and the P3D-Attention module further comprises a dual-channel attention model (DCAM) and a spatial attention module (SAM) that improve correlation of important features.

7. The method for detecting an abnormal traffic behavior according to claim 6, wherein the DCAM combines the 1×3×3 convolution kernel in the spatial domain with the 3×1×1 convolution kernel in the time domain to form the 3×3×3 convolution, learns a weight of a frame attention module $M_F \in R^{(F \times 1 \times 1 \times 1)}$ to express attention to a frame, and learns a weight of a channel attention module (CAM) $M_C \in R^{(1 \times 1 \times 1 \times C)}$ to express attention to a channel; and F represents a quantity of frames of a feature map $F \in R^{(F \times H \times W \times C)}$, C represents a quantity of channels of the feature map, H represents a height of the feature map, and W represents a width of the feature map.

8. The method for detecting an abnormal traffic behavior according to claim 7, wherein the SAM learns location information in a weight matrix $M_S \in R^{(1 \times W \times H \times 1)}$ of a single-channel feature map by using a two-dimensional (2D) convolution kernel, to determine importance and correlation of each location in a video feature map; and F represents the quantity of frames of the feature map $F \in R^{(F \times H \times W \times C)}$, C represents the quantity of channels of the feature map, H represents the height of the feature map, and W represents the width of the feature map.

9. A system for detecting an abnormal traffic behavior, implementing the method for detecting an abnormal traffic behavior according to claim 1, comprising:

a video acquisition and cropping module, configured to acquire a real-time traffic video stream, provide continuous traffic video stream information, display the information on a display module, and transmit the information as input information to a background modeling module;

the background modeling module, used for a reserved interface and configured to perform background modeling and remove a vehicle that moves normally in each frame of a traffic surveillance video from a framework by inputting video stream data in a correct format, to enable an abnormal static target vehicle to be retained in a background;

an abnormal target detection module, configured to perform perspective view cropping on each frame of background extracted through background modeling, and obtain, according to a vehicle size, a cropping box used for cropping the traffic surveillance video; perform abnormal target detection on the traffic surveillance video once every first quantity of frames, to detect abnormal target vehicles in a video frame of the traffic surveillance video; and after an abnormal target vehicle is detected, obtain a cropped picture of the abnormal target vehicle through cropping, and forward or backward crop the traffic surveillance video, by using a location of the abnormal target vehicle as a center, to obtain a cropped video clip whose space capacity is several times the vehicle size and whose time is a second quantity of frames, for subsequent anomaly time estimation;

an anomaly time estimation module, comprising abnormal vehicle status detection and abnormal target matching, wherein the abnormal vehicle status detection is to input the cropped picture of the abnormal target vehicle and the cropped video clip to a network model combining twin cross-correlation with P3D-Attention, detect whether an abnormal target in the cropped video clip is in a static state or a driving state, separately label a classification label on the cropped video clip according to a result of the abnormal vehicle status detection, separately mark the cropped video clip as anomaly, driving, or normal, and determine a video frame when abnormal behavior of the abnormal target vehicle occurs; and the abnormal target matching is to input a to-be-matched vehicle picture and the cropped picture of the abnormal target vehicle to the network model combining twin cross-correlation with P3D-Attention, determine whether the to-be-matched vehicle is an abnormal target vehicle, and determine a start time and an end time of abnormal traffic behavior with reference to the video frame that is obtained when the abnormal behavior of the abnormal target vehicle occurs and that is determined in a detection result of the abnormal target vehicle; and a display module, configured to display video information and image information that are input, and abnormal behavior detection location, anomaly time information, and warning information that are output.

10. A system for detecting an abnormal traffic behavior, implementing the method for detecting an abnormal traffic behavior according to claim 2, comprising:

a video acquisition and cropping module, configured to acquire a real-time traffic video stream, provide continuous traffic video stream information, display the information on a display module, and transmit the information as input information to a background modeling module;

the background modeling module, used for a reserved interface and configured to perform background modeling and remove a vehicle that moves normally in each frame of a traffic surveillance video from a framework by inputting video stream data in a correct format, to enable an abnormal static target vehicle to be retained in a background;

an abnormal target detection module, configured to perform perspective view cropping on each frame of background extracted through background modeling, and obtain, according to a vehicle size, a cropping box used for cropping the traffic surveillance video; perform abnormal target detection on the traffic surveillance video once every first quantity of frames, to detect abnormal target vehicles in a video frame of the traffic surveillance video; and after an abnormal target vehicle is detected, obtain a cropped picture of the abnormal target vehicle through cropping, and forward or backward crop the traffic surveillance video, by using a location of the abnormal target vehicle as a center, to obtain a cropped video clip whose space capacity is several times the vehicle size and whose time is a second quantity of frames, for subsequent anomaly time estimation;

an anomaly time estimation module, comprising abnormal vehicle status detection and abnormal target matching, wherein the abnormal vehicle status detection is to input the cropped picture of the abnormal target vehicle and the cropped video clip to a network model combining twin cross-correlation with P3D-Attention, detect whether an abnormal target in the cropped video clip is in a static state or a driving state, separately label a classification label on the cropped video clip according to a result of the abnormal vehicle status detection, separately mark the cropped video clip as anomaly, driving, or normal, and determine a video frame when abnormal behavior of the abnormal target vehicle occurs; and the abnormal target matching is to input a to-be-matched vehicle picture and the cropped picture of the abnormal target vehicle to the network model combining twin cross-correlation with P3D-Attention, determine whether the to-be-matched vehicle is an abnormal target vehicle, and determine a start time and an end time of abnormal traffic behavior with reference to the video frame that is obtained when the abnormal behavior of the abnormal target vehicle occurs and that is determined in a detection result of the abnormal target vehicle; and a display module, configured to display video information and image information that are input, and abnormal behavior detection location, anomaly time information, and warning information that are output.

11. A system for detecting an abnormal traffic behavior, implementing the method for detecting an abnormal traffic behavior according to claim 3, comprising:

a video acquisition and cropping module, configured to acquire a real-time traffic video stream, provide continuous traffic video stream information, display the information on a display module, and transmit the information as input information to a background modeling module;

the background modeling module, used for a reserved interface and configured to perform background modeling and remove a vehicle that moves normally in each frame of a traffic surveillance video from a framework by inputting video stream data in a correct format, to enable an abnormal static target vehicle to be retained in a background;

an abnormal target detection module, configured to perform perspective view cropping on each frame of background extracted through background modeling, and obtain, according to a vehicle size, a cropping box used for cropping the traffic surveillance video; perform abnormal target detection on the traffic surveillance video once every first quantity of frames, to detect abnormal target vehicles in a video frame of the traffic surveillance video; and after an abnormal target vehicle is detected, obtain a cropped picture of the abnormal target vehicle through cropping, and forward or backward crop the traffic surveillance video, by using a location of the abnormal target vehicle as a center, to obtain a cropped video clip whose space capacity is several times the vehicle size and whose time is a second quantity of frames, for subsequent anomaly time estimation;

an anomaly time estimation module, comprising abnormal vehicle status detection and abnormal target matching, wherein the abnormal vehicle status detection is to input the cropped picture of the abnormal target vehicle and the cropped video clip to a network model combining twin cross-correlation with P3D-Attention, detect whether an abnormal target in the cropped video clip is in a static state or a driving state, separately label a classification label on the cropped video clip according to a result of the abnormal vehicle status detection, separately mark the cropped video clip as anomaly, driving, or normal, and determine a video frame when abnormal behavior of the abnormal target vehicle occurs; and the abnormal target matching is to input a to-be-matched vehicle picture and the cropped picture of the abnormal target vehicle to the network model combining twin cross-correlation with P3D-Attention, determine whether the to-be-matched vehicle is an abnormal target vehicle, and determine a start time and an end time of abnormal traffic behavior with reference to the video frame that is obtained when the abnormal behavior of the abnormal target vehicle occurs and that is determined in a detection result of the abnormal target vehicle; and a display module, configured to display video information and image information that are input, and abnormal behavior detection location, anomaly time information, and warning information that are output.

12. A system for detecting an abnormal traffic behavior, implementing the method for detecting an abnormal traffic behavior according to claim 4, comprising:

a video acquisition and cropping module, configured to acquire a real-time traffic video stream, provide continuous traffic video stream information, display the information on a display module, and transmit the information as input information to a background modeling module;

the background modeling module, used for a reserved interface and configured to perform background modeling and remove a vehicle that moves normally in each frame of a traffic surveillance video from a framework by inputting video stream data in a correct format, to enable an abnormal static target vehicle to be retained in a background;

an abnormal target detection module, configured to perform perspective view cropping on each frame of background extracted through background modeling, and obtain, according to a vehicle size, a cropping box used for cropping the traffic surveillance video; perform abnormal target detection on the traffic surveillance video once every first quantity of frames, to detect abnormal target vehicles in a video frame of the traffic surveillance video; and after an abnormal target vehicle is detected, obtain a cropped picture of the abnormal target vehicle through cropping, and forward or backward crop the traffic surveillance video, by using a location of the abnormal target vehicle as a center, to obtain a cropped video clip whose space capacity is several times the vehicle size and whose time is a second quantity of frames, for subsequent anomaly time estimation;

an anomaly time estimation module, comprising abnormal vehicle status detection and abnormal target matching, wherein the abnormal vehicle status detection is to input the cropped picture of the abnormal target vehicle and the cropped video clip to a network model combining twin cross-correlation with P3D-Attention, detect whether an abnormal target in the cropped video clip is in a static state or a driving state, separately label a classification label on the cropped video clip according to a result of the abnormal vehicle status detection, separately mark the cropped video clip as anomaly, driving, or normal, and determine a video frame when abnormal behavior of the abnormal target vehicle occurs; and the abnormal target matching is to input a to-be-matched vehicle picture and the cropped picture of the abnormal target vehicle to the network model combining twin cross-correlation with P3D-Attention, determine whether the to-be-matched vehicle is an abnormal target vehicle, and determine a start time and an end time of abnormal traffic behavior with reference to the video frame that is obtained when the abnormal behavior of the abnormal target vehicle occurs and that is determined in a detection result of the abnormal target vehicle; and a display module, configured to display video information and image information that are input, and abnormal behavior detection location, anomaly time information, and warning information that are output.

13. A system for detecting an abnormal traffic behavior, implementing the method for detecting an abnormal traffic behavior according to claim 5, comprising:

a video acquisition and cropping module, configured to acquire a real-time traffic video stream, provide continuous traffic video stream information, display the information on a display module, and transmit the information as input information to a background modeling module;

the background modeling module, used for a reserved interface and configured to perform background modeling and remove a vehicle that moves normally in each frame of a traffic surveillance video from a framework by inputting video stream data in a correct format, to enable an abnormal static target vehicle to be retained in a background;

an abnormal target detection module, configured to perform perspective view cropping on each frame of background extracted through background modeling, and obtain, according to a vehicle size, a cropping box used for cropping the traffic surveillance video; perform abnormal target detection on the traffic surveillance video once every first quantity of frames, to detect abnormal target vehicles in a video frame of the traffic surveillance video; and after an abnormal target vehicle is detected, obtain a cropped picture of the abnormal target vehicle through cropping, and forward or backward crop the traffic surveillance video, by using a location of the abnormal target vehicle as a center, to obtain a cropped video clip whose space capacity is several times the vehicle size and whose time is a second quantity of frames, for subsequent anomaly time estimation;

an anomaly time estimation module, comprising abnormal vehicle status detection and abnormal target matching, wherein the abnormal vehicle status detection is to input the cropped picture of the abnormal target vehicle and the cropped video clip to a network model combining twin cross-correlation with P3D-Attention, detect whether an abnormal target in the cropped video clip is in a static state or a driving state, separately label a classification label on the cropped video clip according to a result of the abnormal vehicle status detection, separately mark the cropped video clip as anomaly, driving, or normal, and determine a video frame when abnormal behavior of the abnormal target vehicle occurs; and the abnormal target matching is to input a to-be-matched vehicle picture and the cropped picture of the abnormal target vehicle to the network model combining twin cross-correlation with P3D-Attention, determine whether the to-be-matched vehicle is an abnormal target vehicle, and determine a start time and an end time of abnormal traffic behavior with reference to the video frame that is obtained when the abnormal behavior of the abnormal target vehicle occurs and that is determined in a detection result of the abnormal target vehicle; and a display module, configured to display video information and image information that are input, and abnormal behavior detection location, anomaly time information, and warning information that are output.

14. A system for detecting an abnormal traffic behavior, implementing the method for detecting an abnormal traffic behavior according to claim 6, comprising:
   a video acquisition and cropping module, configured to acquire a real-time traffic video stream, provide continuous traffic video stream information, display the information on a display module, and transmit the information as input information to a background modeling module;
   the background modeling module, used for a reserved interface and configured to perform background modeling and remove a vehicle that moves normally in each frame of a traffic surveillance video from a framework by inputting video stream data in a correct format, to enable an abnormal static target vehicle to be retained in a background;
   an abnormal target detection module, configured to perform perspective view cropping on each frame of background extracted through background modeling, and obtain, according to a vehicle size, a cropping box used for cropping the traffic surveillance video; perform abnormal target detection on the traffic surveillance video once every first quantity of frames, to detect abnormal target vehicles in a video frame of the traffic surveillance video; and after an abnormal target vehicle is detected, obtain a cropped picture of the abnormal target vehicle through cropping, and forward or backward crop the traffic surveillance video, by using a location of the abnormal target vehicle as a center, to obtain a cropped video clip whose space capacity is several times the vehicle size and whose time is a second quantity of frames, for subsequent anomaly time estimation;
   an anomaly time estimation module, comprising abnormal vehicle status detection and abnormal target matching, wherein the abnormal vehicle status detection is to input the cropped picture of the abnormal target vehicle and the cropped video clip to a network model combining twin cross-correlation with P3D-Attention, detect whether an abnormal target in the cropped video clip is in a static state or a driving state, separately label a classification label on the cropped video clip according to a result of the abnormal vehicle status detection, separately mark the cropped video clip as anomaly, driving, or normal, and determine a video frame when abnormal behavior of the abnormal target vehicle occurs; and the abnormal target matching is to input a to-be-matched vehicle picture and the cropped picture of the abnormal target vehicle to the network model combining twin cross-correlation with P3D-Attention, determine whether the to-be-matched vehicle is an abnormal target vehicle, and determine a start time and an end time of abnormal traffic behavior with reference to the video frame that is obtained when the abnormal behavior of the abnormal target vehicle occurs and that is determined in a detection result of the abnormal target vehicle; and
   a display module, configured to display video information and image information that are input, and abnormal behavior detection location, anomaly time information, and warning information that are output.

15. A system for detecting an abnormal traffic behavior, implementing the method for detecting an abnormal traffic behavior according to claim 7, comprising:
   a video acquisition and cropping module, configured to acquire a real-time traffic video stream, provide continuous traffic video stream information, display the information on a display module, and transmit the information as input information to a background modeling module;
   the background modeling module, used for a reserved interface and configured to perform background modeling and remove a vehicle that moves normally in each frame of a traffic surveillance video from a framework by inputting video stream data in a correct format, to enable an abnormal static target vehicle to be retained in a background;
   an abnormal target detection module, configured to perform perspective view cropping on each frame of background extracted through background modeling, and obtain, according to a vehicle size, a cropping box used for cropping the traffic surveillance video; perform abnormal target detection on the traffic surveillance video once every first quantity of frames, to detect abnormal target vehicles in a video frame of the traffic surveillance video; and after an abnormal target vehicle is detected, obtain a cropped picture of the abnormal target vehicle through cropping, and forward or backward crop the traffic surveillance video, by using a location of the abnormal target vehicle as a center, to obtain a cropped video clip whose space capacity is several times the vehicle size and whose time is a second quantity of frames, for subsequent anomaly time estimation;
   an anomaly time estimation module, comprising abnormal vehicle status detection and abnormal target matching, wherein the abnormal vehicle status detection is to input the cropped picture of the abnormal target vehicle and the cropped video clip to a network model combining twin cross-correlation with P3D-Attention, detect whether an abnormal target in the cropped video clip is in a static state or a driving state, separately label a classification label on the cropped video clip according to a result of the abnormal vehicle status detection, separately mark the cropped video clip as anomaly, driving, or normal, and determine a video frame when abnormal behavior of the abnormal target vehicle occurs; and the abnormal target matching is to input a to-be-matched vehicle picture and the cropped picture of the abnormal target vehicle to the network model combining twin cross-correlation with P3D-Attention, determine whether the to-be-matched vehicle is an abnormal target vehicle, and determine a start time and an end time of abnormal traffic behavior with reference to the video frame that is obtained when the abnormal behavior of the abnormal target vehicle occurs and that is determined in a detection result of the abnormal target vehicle; and
   a display module, configured to display video information and image information that are input, and abnormal behavior detection location, anomaly time information, and warning information that are output.

16. A system for detecting an abnormal traffic behavior, implementing the method for detecting an abnormal traffic behavior according to claim 8, comprising:
   a video acquisition and cropping module, configured to acquire a real-time traffic video stream, provide continuous traffic video stream information, display the information on a display module, and transmit the information as input information to a background modeling module;

the background modeling module, used for a reserved interface and configured to perform background modeling and remove a vehicle that moves normally in each frame of a traffic surveillance video from a framework by inputting video stream data in a correct format, to enable an abnormal static target vehicle to be retained in a background;

an abnormal target detection module, configured to perform perspective view cropping on each frame of background extracted through background modeling, and obtain, according to a vehicle size, a cropping box used for cropping the traffic surveillance video; perform abnormal target detection on the traffic surveillance video once every first quantity of frames, to detect abnormal target vehicles in a video frame of the traffic surveillance video; and after an abnormal target vehicle is detected, obtain a cropped picture of the abnormal target vehicle through cropping, and forward or backward crop the traffic surveillance video, by using a location of the abnormal target vehicle as a center, to obtain a cropped video clip whose space capacity is several times the vehicle size and whose time is a second quantity of frames, for subsequent anomaly time estimation;

an anomaly time estimation module, comprising abnormal vehicle status detection and abnormal target matching, wherein the abnormal vehicle status detection is to input the cropped picture of the abnormal target vehicle and the cropped video clip to a network model combining twin cross-correlation with P3D-Attention, detect whether an abnormal target in the cropped video clip is in a static state or a driving state, separately label a classification label on the cropped video clip according to a result of the abnormal vehicle status detection, separately mark the cropped video clip as anomaly, driving, or normal, and determine a video frame when abnormal behavior of the abnormal target vehicle occurs; and the abnormal target matching is to input a to-be-matched vehicle picture and the cropped picture of the abnormal target vehicle to the network model combining twin cross-correlation with P3D-Attention, determine whether the to-be-matched vehicle is an abnormal target vehicle, and determine a start time and an end time of abnormal traffic behavior with reference to the video frame that is obtained when the abnormal behavior of the abnormal target vehicle occurs and that is determined in a detection result of the abnormal target vehicle; and a display module, configured to display video information and image information that are input, and abnormal behavior detection location, anomaly time information, and warning information that are output.

* * * * *